United States Patent [19]

Yamamoto et al.

[11] Patent Number: 5,023,632
[45] Date of Patent: Jun. 11, 1991

[54] ELECTROPHOTOGRAPHIC IMAGE FORMING METHOD

[75] Inventors: Hajime Yamamoto, Ibaraki; Yukimasa Kuramoto, Takarazuka; Yuji Takashima, Nishinomiya; Masahiko Nakamura, Osaka; Kenichi Nakano, Neyagawa, all of Japan

[73] Assignee: Matsushita Electric Industrial Co., Ltd., Osaka, Japan

[21] Appl. No.: 415,204

[22] PCT Filed: Dec. 23, 1988

[86] PCT No.: PCT/JP88/01315
§ 371 Date: Oct. 16, 1989
§ 102(e) Date: Oct. 16, 1989

[87] PCT Pub. No.: WO89/05999
PCT Pub. Date: Jun. 29, 1989

[30] Foreign Application Priority Data

Dec. 23, 1987 [JP] Japan .................. 62-325812

[51] Int. Cl.5 .................. G03G 15/01; G01D 15/06
[52] U.S. Cl. .................. 346/157; 346/154; 355/326
[58] Field of Search .................. 346/157, 154; 355/326

[56] References Cited

U.S. PATENT DOCUMENTS

| 4,159,174 | 6/1979 | Rising | 355/77 X |
| 4,734,735 | 3/1988 | Haneda | 355/326 |
| 4,809,037 | 2/1989 | Sato | 346/160 |
| 4,841,337 | 6/1989 | Hiratsuka et al. | 355/326 |

FOREIGN PATENT DOCUMENTS

| 57-60355 | 4/1982 | Japan . |
| 63-8660 | 1/1988 | Japan . |
| 63-8661 | 1/1988 | Japan . |

Primary Examiner—George H. Miller, Jr.
Attorney, Agent, or Firm—Panitch Schwarze Jacobs & Nadel

[57] ABSTRACT

An electrophotographic color image forming method whereby black, yellow, magenta and cyan toner images are superimposed on a photoconductor (54) to transfer to paper, exposure being changed between black and color in a method in which development of black is performed by a contact developing method, and development of color by a direct current electric field projection developing method. Also, in exposure for color, the exposure amount is adjusted between highlight and shadow areas. A full color image of high saturation with good balance between black and color components is reproduced by changing the exposure amount between black and color. It is also possible to obtain a color image with good reproducibility of highlight areas as well as shadow areas.

18 Claims, 11 Drawing Sheets

Logic for determining the exposure amount for color

○ Spot not to be exposed

◐ Spot to be exposed

☆ Attention spot

✳ Reference spot

Logic for determining the exposure amount for color

○ Spot not to be exposed

◉ Spot to be exposed

☆ Attention spot

⊛ Reference spot

Exposure amount (Intensity on the photoconductor)

|  | Reference exposure amount | Increased exposure amount |
|---|---|---|
| Color | 1.5 mW | 3.4 mW |
| White and Black | 1.0 mW | 1.0 mW |

Logic for determining the exposure amount for color

◯ Dot not to be exposed

⊘ Dot to be exposed

☆ Attention dot

✻ Reference dot

Light intensity distribution

Exposure potential distribution

Referential examples of reference spots

8/8: All 8 reference spots are in a non-exposure state

2/8: Two of the 8 reference spots are in a non-exposure state
For example,

1/8: One of the 8 reference spots are in a non-exposure state
For example,

0/8: None of the 8 reference spots are in a non-exposure state

7/8: Seven of the 8 reference spots are in a non-exposure state

3/8: Three of the 8 reference spots are in a non-exposure state

ELECTROPHOTOGRAPHIC IMAGE FORMING METHOD

TECHNICAL FIELD

The present invention relates to an electrophotographic image forming method which can be utilized for a hard copy apparatus such as a copying machine, a printer or the like.

BACKGROUND ART

There have been proposed heretofore various methods for the formation of electrophotographic color images wherein the cycle of charging, exposure and developing is repeated a plurality of times to form a plurality of toner images of different colors on an electrophotographic photoconductor (hereinafter called a photoconductor), the toner images then being transferred onto paper to reproduce a color copy image thereon.

As an example of apparatuses using such electrophotographic color image forming methods, the apparatus has been proposed by the inventors of the present invention in Japanese Patent Application No. 62-4367, is described below with reference to FIG. 2.

The reference numerals 1, 2, 3 and 4 indicate monocomponent, non-magnetic developer units of non-contact type which project toner in a direct current electric field. The toner is charged triboelectrically with conductive fur brushes 5, 6, 7 and 8 which are disposed in a contacting array with respective developing rollers, thereby causing a thin layer of toner to form on the aluminum developing rollers 9, 10, 11 and 12 by means of respective blades 13, 14, 15 and 16. The developer unit 1 contains insulative toner of yellow (Y), the developer unit 2, magenta (M), the developer unit 3, cyan (C), and the developer unit 4 black (Bk). The developer units are disposed facing the circumference of a photoconductor 17, with a given gap (developing gap) provided between each of the developing rollers 9, 10, 11 and 12 and the photoconductor 17. Each developer unit is provided with a moving mechanism for causing it to move closer to the photoconductor 17 when developing is performed and to retract when developing is not performed. The following shows the specification and developing conditions of each developer unit, and the properties of the toner used.

SPECIFICATION OF DEVELOPER UNIT AND DEVELOPING CONDITIONS

Diameter of developing roller: 16 mm
Surface speed of developing roller: 150 mm/s
Rotating direction of developing roller:
With-direction of photoconductor Toner layer thickness on developing roller: 30 $\mu$m Developing gap (gap between developing roller surface and photoconductor surface): 150 $\mu$m in developing condition, 700 $\mu$m in non-developing condition

PROPERTIES OF TONER

Charge amount of toner: $+3$ $\mu$C/g
Average particle diameter: 10 $\mu$m
Relative permittivity: Approximately 2

An amorphous Se-Te photoconductive drum of 100 mm in diameter having increased sensitivity to the longer wavelength in the infrared region is used for the photoconductor 17 (with a thickness of 60 $\mu$m and a relative permittivity of 6.3), which is made to rotate at the surface speed of 150 mm/s. The photoconductor 17 is charged at the surface potential of $+700$ V by means of a corona charger 18 (scorotron charger, corona voltage: $+7$ kV, grid voltage: $+820$ V).

Next, a light emitting diode array 19 is energized to emit light of 670 nm wavelength, exposing the photoconductor through a self-focusing rod lens array 20. At this time, the light intensity on the photoconductor surface is 2.2 $\mu$J/cm$^2$. Using the light emitting diode array 19, a negative yellow signal is first projected onto the photoconductor 17 to form an electrostatic latent image. The latent image is then reversely developed by the yellow developer unit 1 which is put in a developing condition with $+600$ V applied to the developing roller 9. Thereafter, the photoconductor 17 is made to pass the magenta developer unit 2, the cyan developer unit 3 and the black developer unit 4, all in a non-developing condition, to form a yellow toner image.

The photoconductor 17 is again charged at $+850$ V by the corona charger 18. The photoconductor 17 is then exposed to the light of the signal corresponding to magenta by means of the light emitting diode array 19, to form a magenta electrostatic latent image. Thereafter, the photoconductor 17 is made to pass the yellow developer unit 1 in a non-developing condition, the magenta developer unit 2 in a developing condition with $+700$ V applied to the developing roller 10, and the cyan developer unit 3 and black developer unit 4 both in a non-developing condition, to form a magenta toner image.

Next, the photoconductor 17 is charged at $+880$ V by the corona charger 18. The photoconductor 17 is then exposed to the light of signal corresponding to cyan by means of the light emitting diode array 19 to form a cyan electrostatic latent image. Thereafter, the photoconductor 17 is made to pass the yellow developer unit 1 and magenta developer unit 2, both in a non-developing condition, and the cyan developer unit 3 in a developing condition with $+800$ V applied to the developing roller 11, to form a cyan toner image. Then, the photoconductor 17 is made to pass the black developer unit 4 in a non-developing condition.

Further, the photoconductor 17 is again charged at $+880$ V by the corona charger 18. Thereafter, the photoconductor is exposed to the light of signal corresponding to black by means of the light emitting diode array 19 to form a black electrostatic latent image. Then, the photoconductor 17 is made to pass the yellow developer unit 1, the magenta developer unit 2, and the cyan developer unit 3, all in a non-developing condition, and the black developer unit 4 in a developing condition with $+800$ V applied to the developing roller 12, to form a black toner image.

The color toner images thus formed on the photoconductor 17 are transferred onto paper 22 by means of a transfer corona 21, the transferred image then being fused by means of a fuser unit 23. In the meantime, after transfer, the surface of the photoconductor 17 is positively charged by means of a precleaning corona charger 24, and then cleaned with a conductive fur brush 25 with $-150$ V applied thereto by pressing it onto the photoconductor 17.

However, when image forming was performed in the above-mentioned conventional electrophotographic color image forming apparatus using a magnetic brush developer unit, shown in FIG. 3 for the black developer unit only, it has been found that there is a problem which is hereinafter described. In FIG. 3, the reference numeral 27 indicates a developing roller containing a magnet therein, 28 a dual-component developer consisting of toner and iron particle carrier, 29 a mixing blade, 30 a feeding auger for feeding toner from a toner hopper, 31 a developer mixing blade, and 32 a doctor blade. The following shows the specification and developing conditions of the black developer unit 26, and the properties of the toner used.

SPECIFICATION AND DEVELOPING CONDITIONS OF DEVELOPER UNIT

Diameter of developing roller 27: 22 mm

Surface speed of developing roller 27: 300 mm/s

Developer layer thickness on developing roller 27: 400 $\mu$m

Rotating direction of developing roller 27: With-direction of the photoconductor (Same feeding direction)

Developing gap (gap between developing roller surface and photoconductor surface): 400 $\mu$m in developing condition, 2 mm in non-developing condition

PROPERTIES OF TONER

Type of developer: Dual-component developer of toner and carrier

Average particle diameter of carrier: Approximately 50 $\mu$m

Type of carrier: Teflon-coated ferrite

Charge amount of toner: +10 $\mu$C/g

Average particle diameter of toner: 8 $\mu$m

Relative permittivity: Approximately 2

Hence, it has been discovered that because the non-contact type direct current electric field projection developing method used for the formation of color images and the contact type magnetic brush developing method used for the formation of black images are totally different developing methods, there are no exposing conditions applicable in common to the best reproduction of both images, therefore, a color image of good quality cannot be obtained. To be specific, when the black and color images are developed under the same exposing conditions, it has been found that the black image comes out thick in contours, strong in black components, and low in saturation, as compared with the other color images.

Furthermore, when a color image having half tone areas was formed by the use of the above conventional electrophotographic color image forming apparatus, it has been found that there is another problem, that is, a uniform color image of good quality cannot be obtained when the highlight areas and shadow areas are developed under the same exposing conditions by the non-contact developing method used for the formation of color images. When the image was developed under the same exposing conditions, the highlight areas in the color image were not sufficiently developed, tending to come out missing in parts, and the reproducibility of fine lines was poor, the image lacking sharpness and thus resulting in a color image of poor quality.

DISCLOSURE OF THE INVENTION

One of the objects of the present invention is to provide an electrophotographic image forming method in which the balance between the black and color components is optimized, thus reproducing a good full color image. Another object of the invention is to provide an electrophotographic image forming method for forming a toner image using a direct current electric field projection developing method, in which highlight areas are reproduced in good condition while preventing shadow areas from overtoning.

BEST MODE OF THE INVENTION

Figures 1A, 1B:
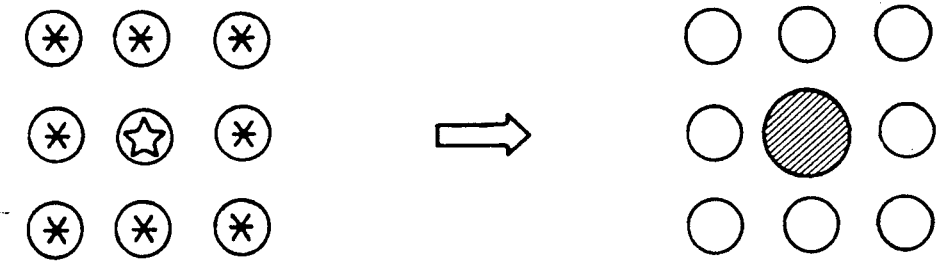
FIG. 1 is a diagram explaining the logic in an electrophotographic color image forming method according to one embodiment of the present invention.
Figure 2:
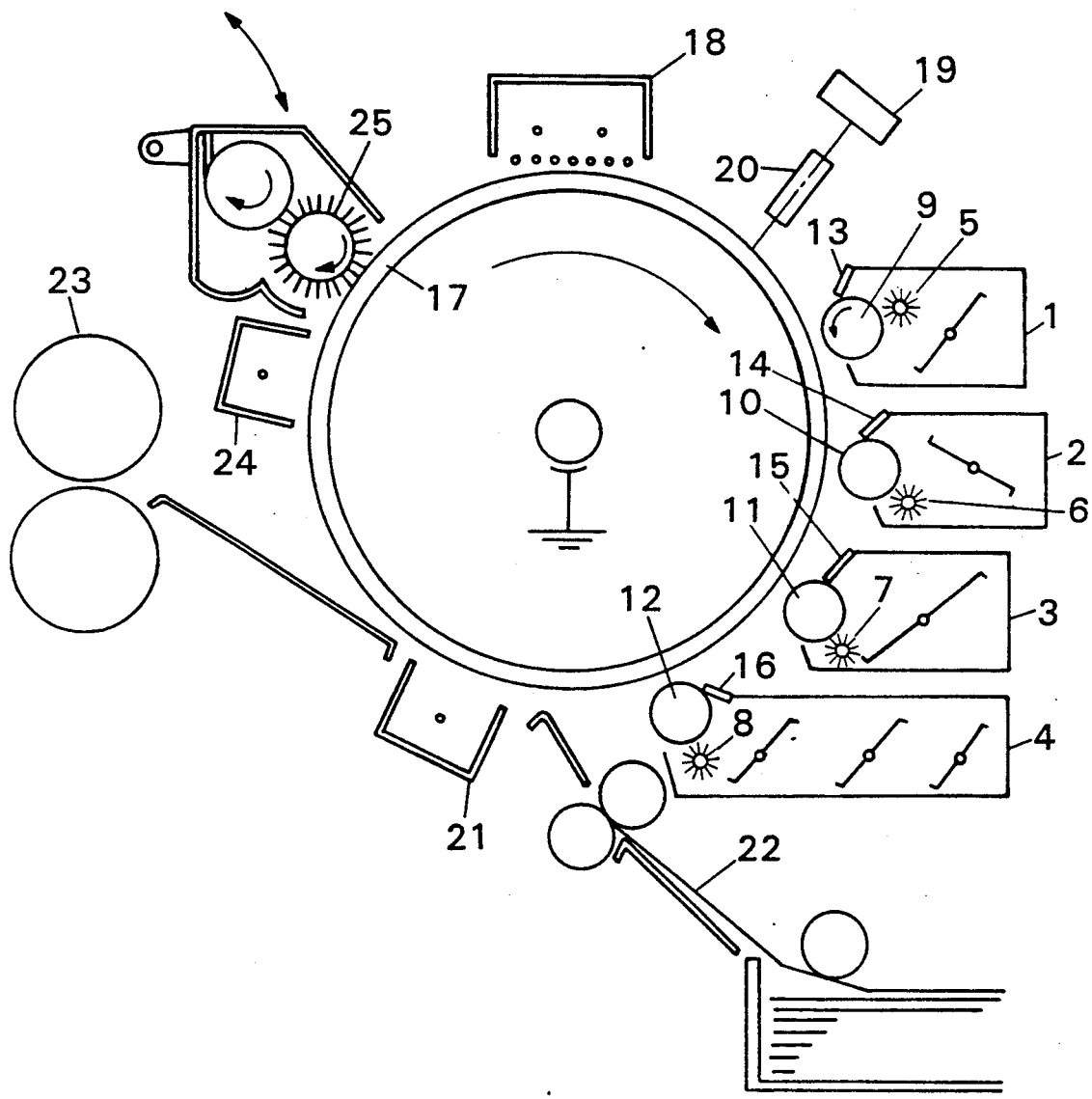
FIG. 2 is a schematic diagram of a conventional electrophotographic color image forming apparatus.
Figure 3:
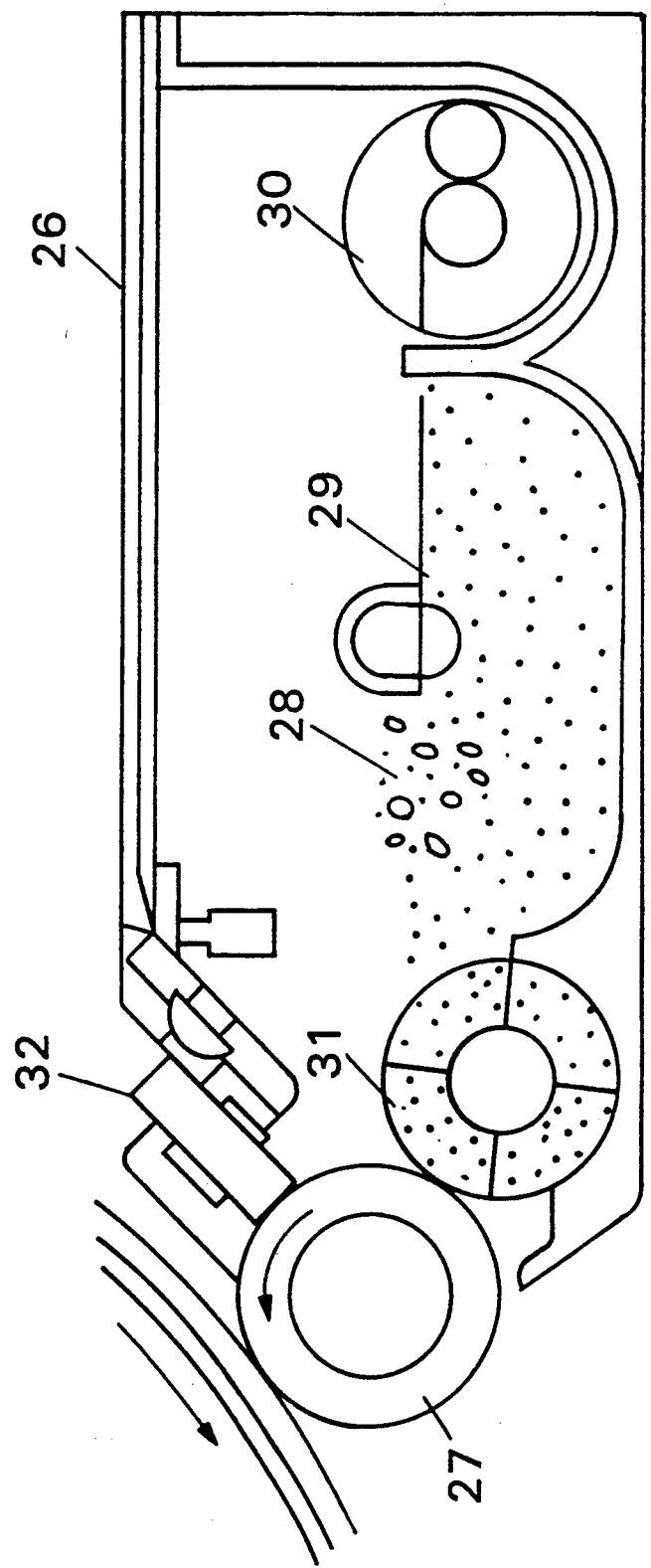
FIG. 3 is a schematic diagram of a magnetic brush type black developer unit used in the apparatus of FIG. 2.

The present invention provides an electrophotographic image forming method for reproducing a color copy image by repeating the cycle of charging, exposing and developing a plurality of times to superpose black and color toner images on a photoconductor, wherein exposure is provided by a beam of light decomposed in pixels, the exposure amount for a beam spot being changed between black and color images.

The present invention also provides an electrophotographic image forming method in which development is performed by a direct current electric field projection developing method, exposure being provided by a beam of light decomposed in pixels and being adjusted for an attention spot to be exposed on a photoconductor by referring to several spots surrounding the attention spot.

In an electrophotographic color image forming method in which developing methods of different developing characteristics for black and color are combined, there exist different exposure amounts suitable for respective developing methods. To be specific, by setting the exposure amount for black at a lower value than that for color, the black component is slightly suppressed on the entire image area, permitting reproduction of a copy image of high saturation with good color balance.

In the present invention, the shadow areas in an image indicate the dark areas in the image, and the highlight areas indicate the light areas in the image, both terms having the same meanings as generally used in the printing industry.

To suppress the black component as compared with color components, the reference exposure amount for color should preferably be set in the range of 1.1 to 3.0 times that for black. With the exposure amount less than 1.1 times, the color components will come out too weak, while with the exposure more than 3.0 times, the color components will come out too strong, thus resulting in a poor copy image.

To reproduce shadow areas of an image, a reference exposure amount and a decreased exposure amount should be prepared for every spot, and the decreased exposure amount should preferably be used for the shadow areas. On the other hand, to emphasize highlight areas of an image, a reference exposure amount and an increased exposure amount should be prepared for every spot, and the increased exposure amount should preferably be used selectively for the highlight areas. In the case of an image having both shadow and highlight areas, it will be more effective if the decreased exposure amount is selectively used for the shadow areas, while selectively using the increased exposure amount for the highlight areas.

To enhance the reproducibility of shadow areas, the exposure amount for the shadow areas should be decreased. The most effective result has been obtained when the decreased exposure amount was set in the range of 0.5 to 0.9 time the reference exposure amount. With the exposure less than 0.5 time, the exposure was insufficient, while with the exposure more than 0.9 time, no effect was recognized of decreasing the exposure amount.

To enhance the reproducibility of highlight areas, the exposure amount for the highlight areas should be increased. The most effective result has been obtained when the increased exposure amount was set in the range of 1.3 to 3.0 times the reference exposure amount. With the exposure less than 1.3 times, no effect was recognized of emphasizing the highlight areas, while with the exposure more than 3.0 times, the dots of the exposed electrostatic latent image came out too big, resulting in an unnatural copy image with the highlight areas extremely emphasized.

As the exposure amount for black is decreased, the sharpness of the black image gradually decreases. To suppress the black component and yet to reproduce a sharp black image, it has been found effective to perform the black image forming process prior to other color image forming processes. Particularly, in reproduction of a full color image, the sharpest black component has been obtained when images were formed in the sequence of black, yellow, magenta, and cyan.

In such a method in which the size of a spot to be developed is varied by adjusting the exposure amount, since the size of the electrostatic latent image must be varied as described in the foregoing section of functions, it is important that the distribution of the light intensity of the exposure light source having approximately the Gaussian distribution. Typical examples of such light sources include a laser, a light emitting diode array, and the like.

To provide an increased exposure amount, either the exposure time is made longer with the same exposure output, or the exposure output is increased with the same exposure time. A suitable way for the developing method used for the present invention is to increase the output per unit time as compared with the reference output.

The following describes in further detail the case in which the exposure amount adjusting method of the present invention is applied to an image processing method for constructing density gradations with mesh dots, such as a dither pattern, using a direct current electric field projection developing method for color developer units in reversal development.

Figure 4:
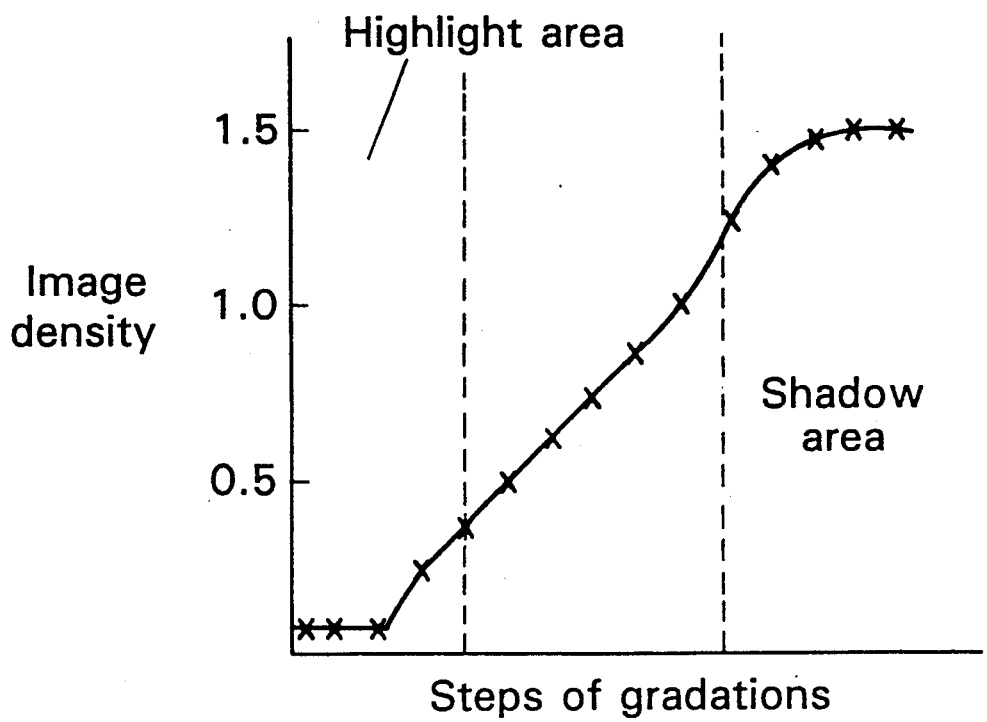
FIG. 4 is a chart illustrating the reproducibility of gradations when the improvement of the present invention is not utilized.

FIG. 4 shows the reproduction result of gradations when the exposure amount for each dot is not varied but fixed at a given value. The image density is plotted along the ordinate of the chart, and the steps of gradations along the abscissa. As shown, in the direct current electric field projection developing method, the resultant image has a poor reproducibility of highlight areas as well as the shadow areas.

Figure 5A:
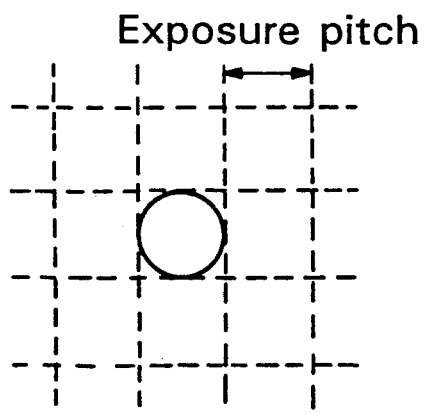
FIG. 5 is a diagram illustrating the reproducibility of a normal dot.
Figure 5B:
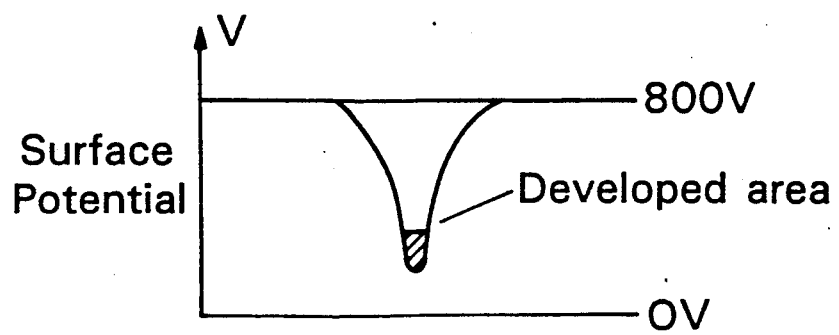

The potential at an isolated dot in an electrostatic latent image formed at this time on the photoconductor is shown in FIG. 5 (a, b). The circle in FIG. 5 (a) represents the dot to be exposed on the photoconductor, and the squares formed by broken lines indicate the positions of the surrounding dots. FIG. 5 (b) is a chart showing the surface potential of the photoconductor where the dot is exposed. The shaded portion in FIG. 5 (b) shows the area where toner adheres when the image is developed by the direct current electric field projection developing method. As is apparent from this Figure, the developed area by the toner comes out smaller than the exposed dot, which is the factor responsible for poor reproducibility of highlight areas in a full color copy image.

Figure 6A:
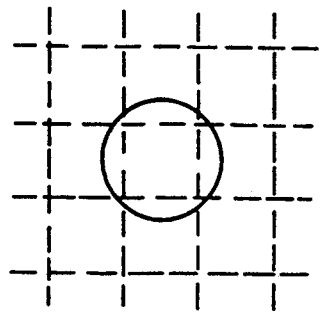
FIG. 6 is a diagram illustrating the reproducibility of an emphasized dot.
Figure 6B:
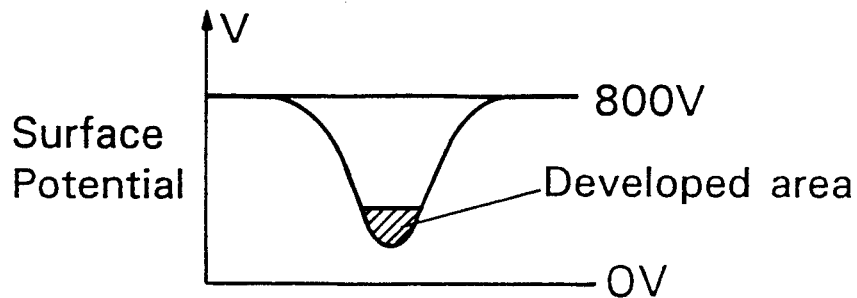

If at this time, the laser output for each dot in the highlight areas is increased, the size of the dot on the photoconductor becomes larger as shown in FIG. 6 (a, b), thus emphasizing the latent image to facilitate development by toner, the size of the reproduced dot coming out closer to the desired size, resulting in a good reproducibility of the highlight area.

Thus, the exposure amount is increased for highlight areas and fine line areas in a color image to emphasize the electrostatic latent image, while it is decreased for shadow areas to prevent dark areas from overtoning. At this time, the judgment as to whether the attention spot which is about to be exposed is in a highlight area or a shadow area can be easily made by referring to the exposure states of the spots surrounding the attention spot. For example, as shown in FIG. 1, if reference spots adjacent to the attention spot to be exposed, i.e., a total of eight spots located at the front, back, left, right, diagonally left and right to the front and diagonally left and right to the back of the attention spot, are all in an exposed state, it may be assumed that the attention spot belongs to a shadow area. On the other hand, if all reference spots are in a non-exposed state, the attention spot may be judged as an isolated spot.

Figure 7:
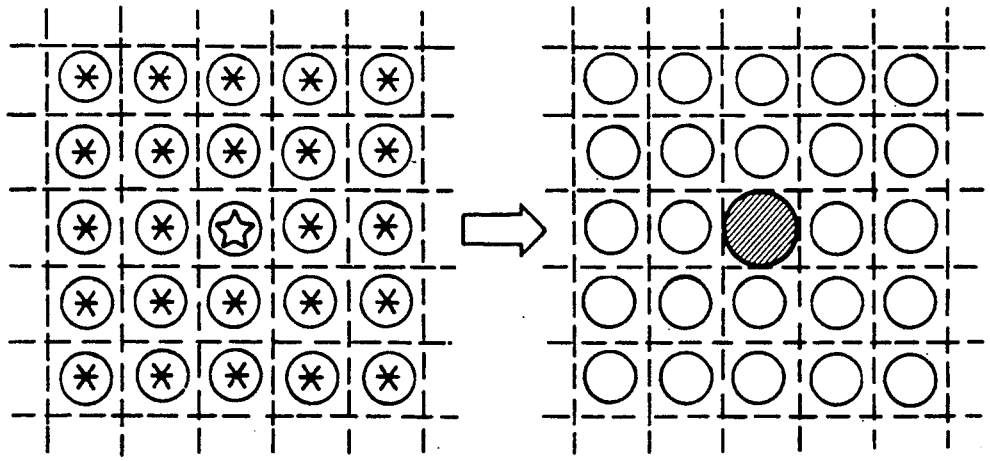
FIG. 7 is a diagram explaining an improved logic in the electrophotographic color image forming method of the present invention.
Figure 8A:
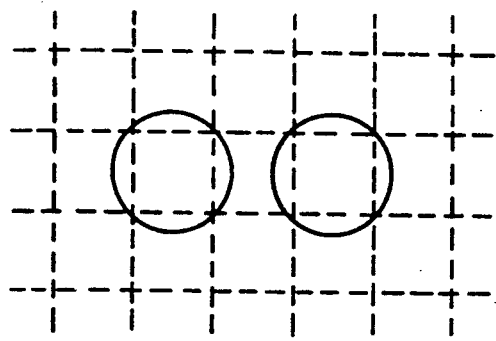
FIG. 8 is a diagram illustrating the reproducibility of an emphasized adjacent dot.
Figure 8B:
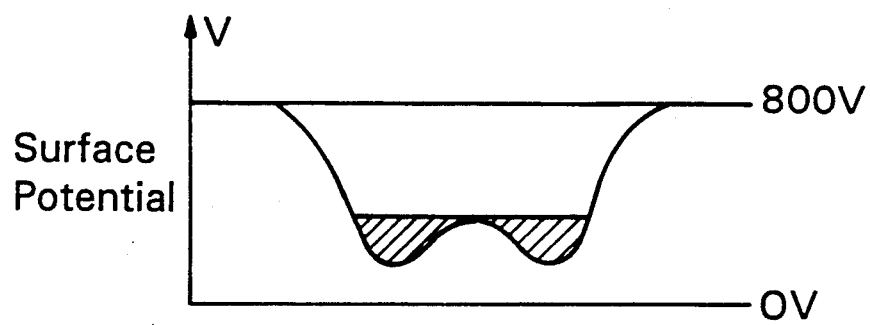
Figure 9A:
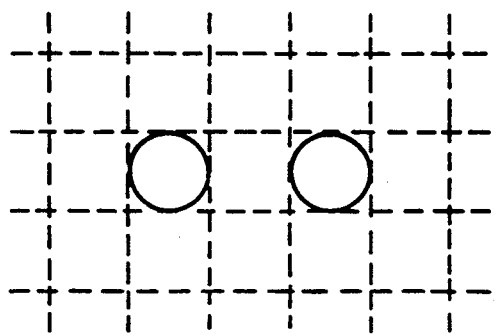
FIG. 9 is a diagram illustrating the reproducibility of a non-emphasized adjacent dot.
Figure 9B:
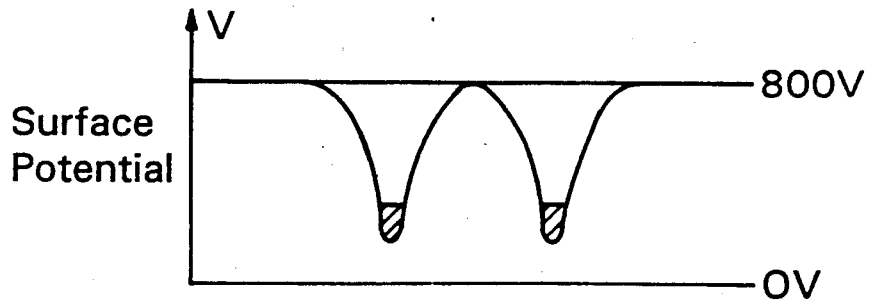

Furthermore, it has been found that a better judgment can be made if, as shown in FIG. 7, not only the eight dots but also the 16 dots adjacent outwardly to the eight dots, thus, a total of 24 dots are referred to, when determining the exposure amount for the dot. In the previously described method, when the dot is judged as an isolated spot, thus increasing the dot intensity for that spot, by referring only to the eight surrounding dots and determining there are no adjacent dots, if a dot two dots away from that attention dot is exposed, the dots which are originally independent of each other will be connected electrostatically, resulting in development of one big guitar-shaped dot, as shown in FIG. 8 (a, b). This emphasizes the highlight area more than necessary. Therefore, in this case, as shown in FIG. 9 (a, b), smoother reproduction of the highlight area can be achieved if the exposure amount for the dots are rather set at the reference exposure amount.

Figure 10A:
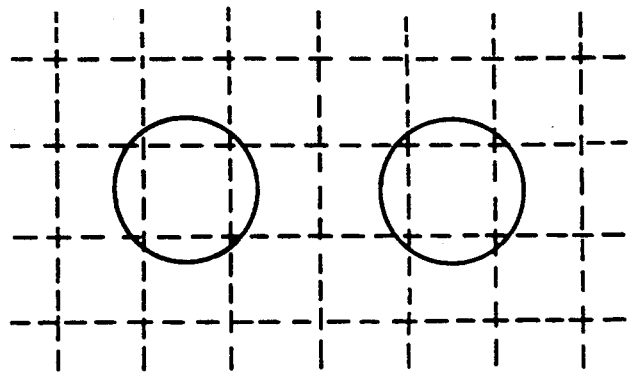
FIG. 10 is a diagram explaining the case in which isolated dots are disposed closest to each other when the logic for determining the color exposure amount in one embodiment of the present invention is used.
Figure 10B:
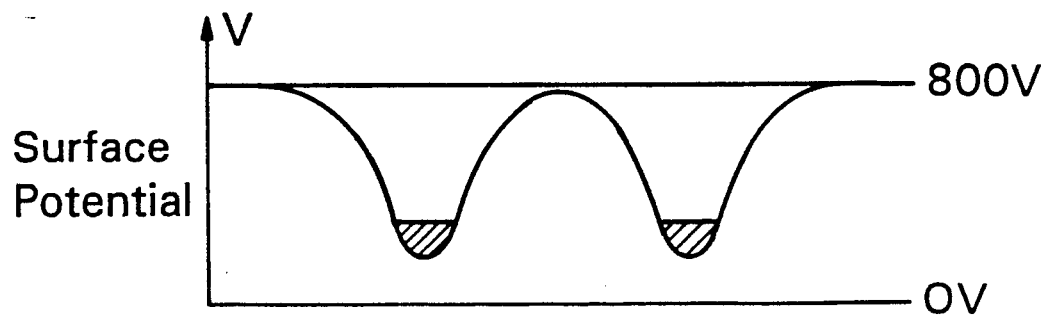
Figure 11:
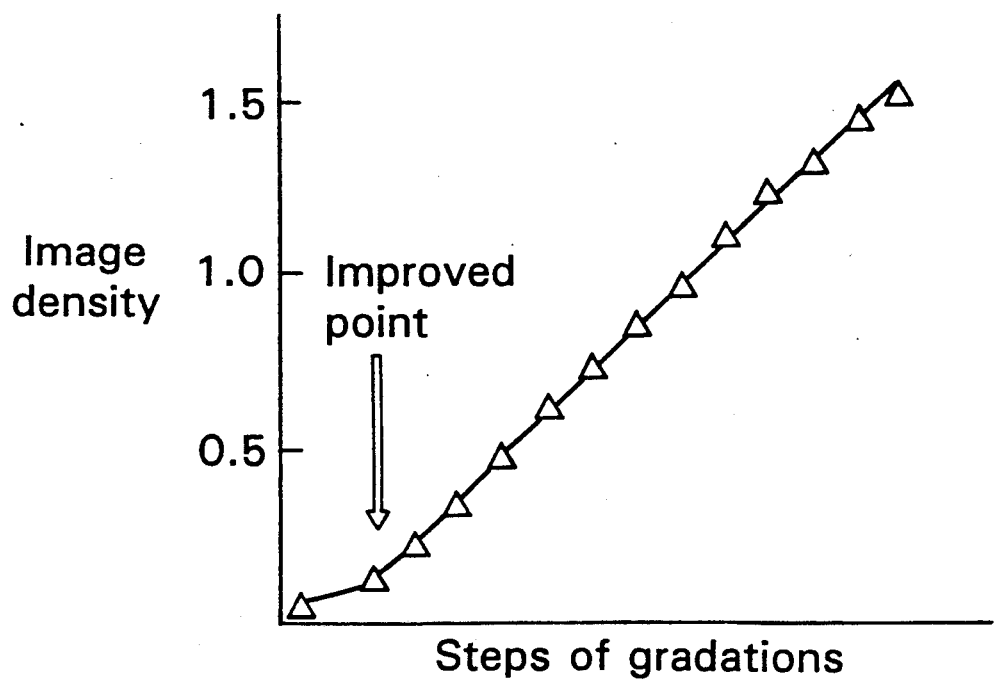
FIG. 11 is a chart explaining the effect of highlight areas improved by the present invention.

For example, using the 24 reference dots shown in FIG. 7, if the light intensity for the dot is increased only when all the 24 dots are non-exposure dots, the latent image of that dot will not be connected with that of another isolated dot even when they are disposed closest to each other, thus the developed dots coming out separately from each other, as shown in FIG. 10 (a, b), and attaining smooth reproduction of highlight area as shown in FIG. 11.

Generally, in a digital processed image, a highlight area comprises dots relatively isolated from one another and dispersed over the entire area. However, in the present invention, for highlight areas of each color, different exposure conditions are used from those for halftone and shadow areas, thus optimizing the exposure conditions for the highlight areas. Therefore, the present invention has the advantage that a color image of good quality with good reproducibility of gradations can be obtained. Also, in the present invention, the output of the light source is adjusted so as to vary the diameters of the reproduced dots. At this time, the output distribution of the light source should preferably approximate the Gaussian distribution as shown in FIG. 12 (a).

Normally, in methods in which a laser intensity is varied, the purpose is achieved by varying the exposure potential for the exposed dot. For example, in some of such methods, the intensity of laser radiation is suppressed below the level of the photoconductor sensitivity, and the phenomenon is utilized in which the developing density becomes variable in the region where the photoconductor potential does not drop below the residual potential. However, the exposure amount adjusting method of the present invention uses a totally different principle from that of such methods.

Figure 12A:
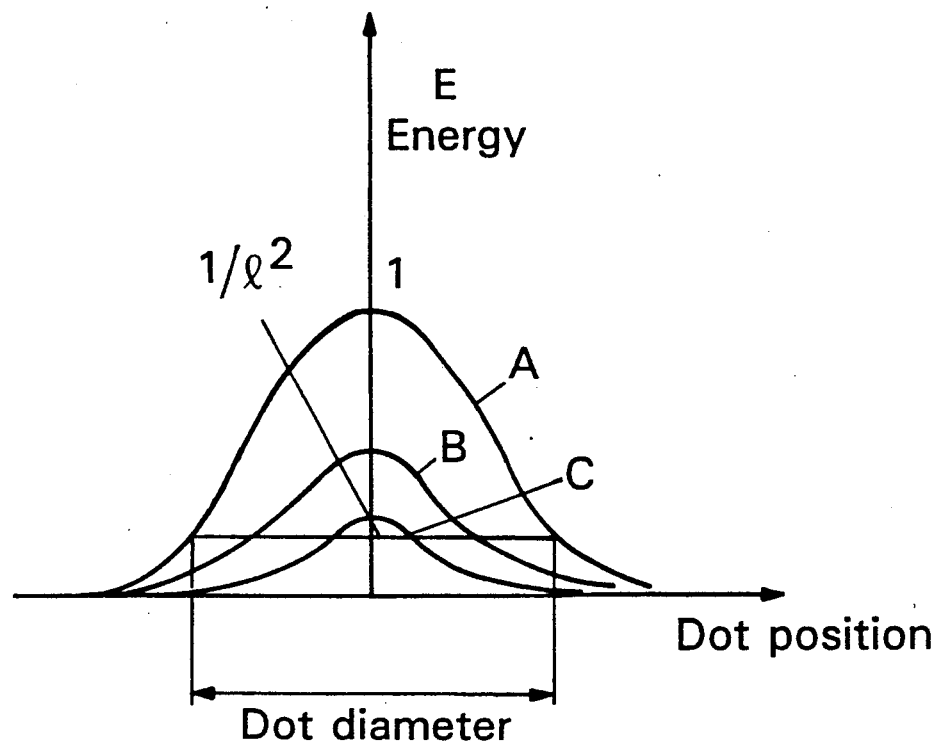
FIG. 12 is a diagram illustrating the distribution of the light intensity for an attention spot suitable for the present invention.
Figure 12B:
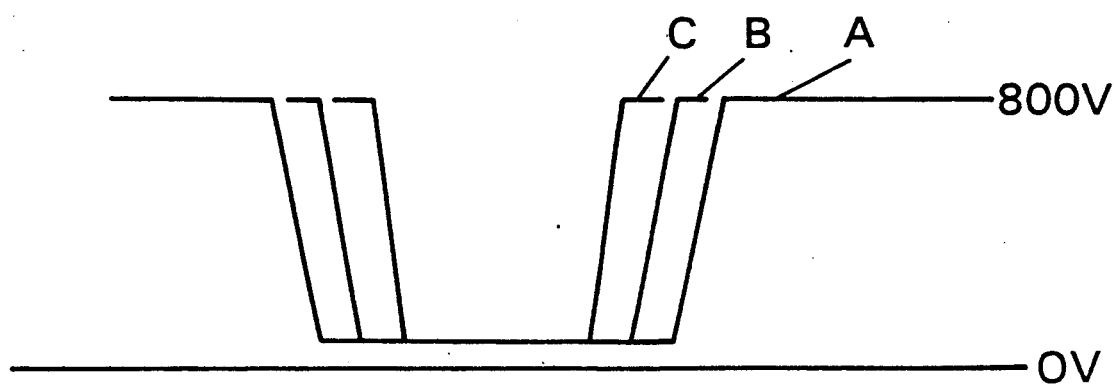
Figure 13A:
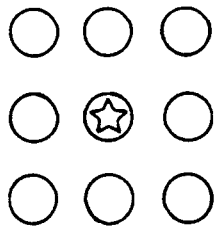
FIG. 13 is a diagram explaining the logic for adjusting the exposure amount for the attention spot according to the present invention.
Figure 13B:
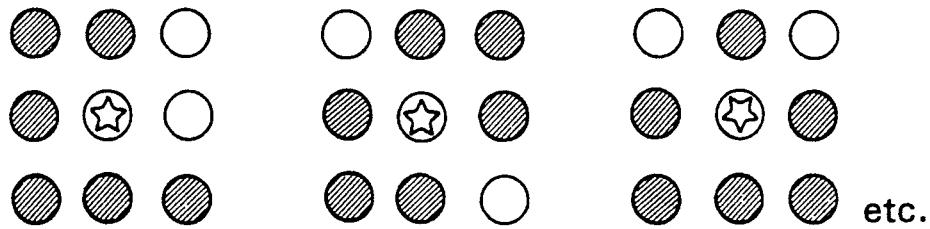
Figure 13C:
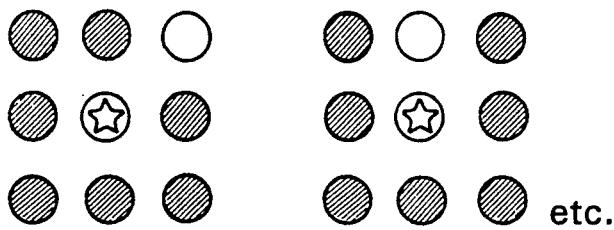
Figure 13D:
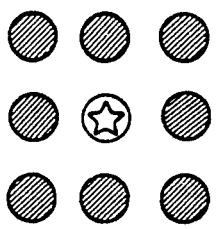
Figure 13E:
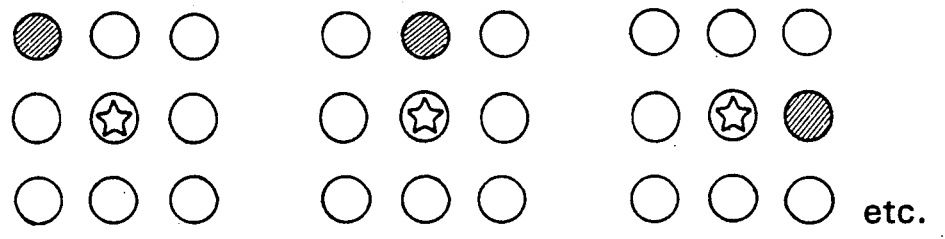
Figure 13F:
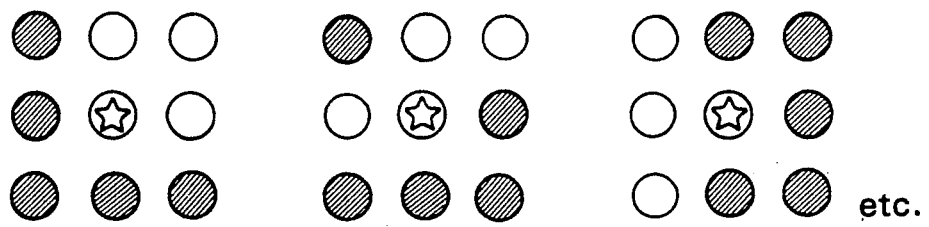

Describing the present invention in further detail, FIG. 12 (a) illustrates results of light intensity measurements on a photoconductor with the dot diameter designed at 90 $\mu$m (the area of $1/e^2$ of peak intensity is rendered as the dot diameter), showing the light intensity distribution with the output of 3.4 mW (A), 1.5 mW (B), and 1.0 mW (C) respectively. FIG. 12 (b) shows the exposure potential distribution of the photoconductor with the above measurements. As is apparent, because the absolute value of the light intensity varies as the laser radiation intensity is changed, the size of the latent image changes as shown in FIG. 12 (b). Accordingly, in this method, the size of the reproduced dot is changed, unlike the previously mentioned method in which density variation is given to each dot without changing its size. It has been found that the exposure amount adjusting method of the present invention is suitable for the direct current electric field projection development.

The following describes specific examples of the present invention.

EXAMPLE 1

Figure 14:
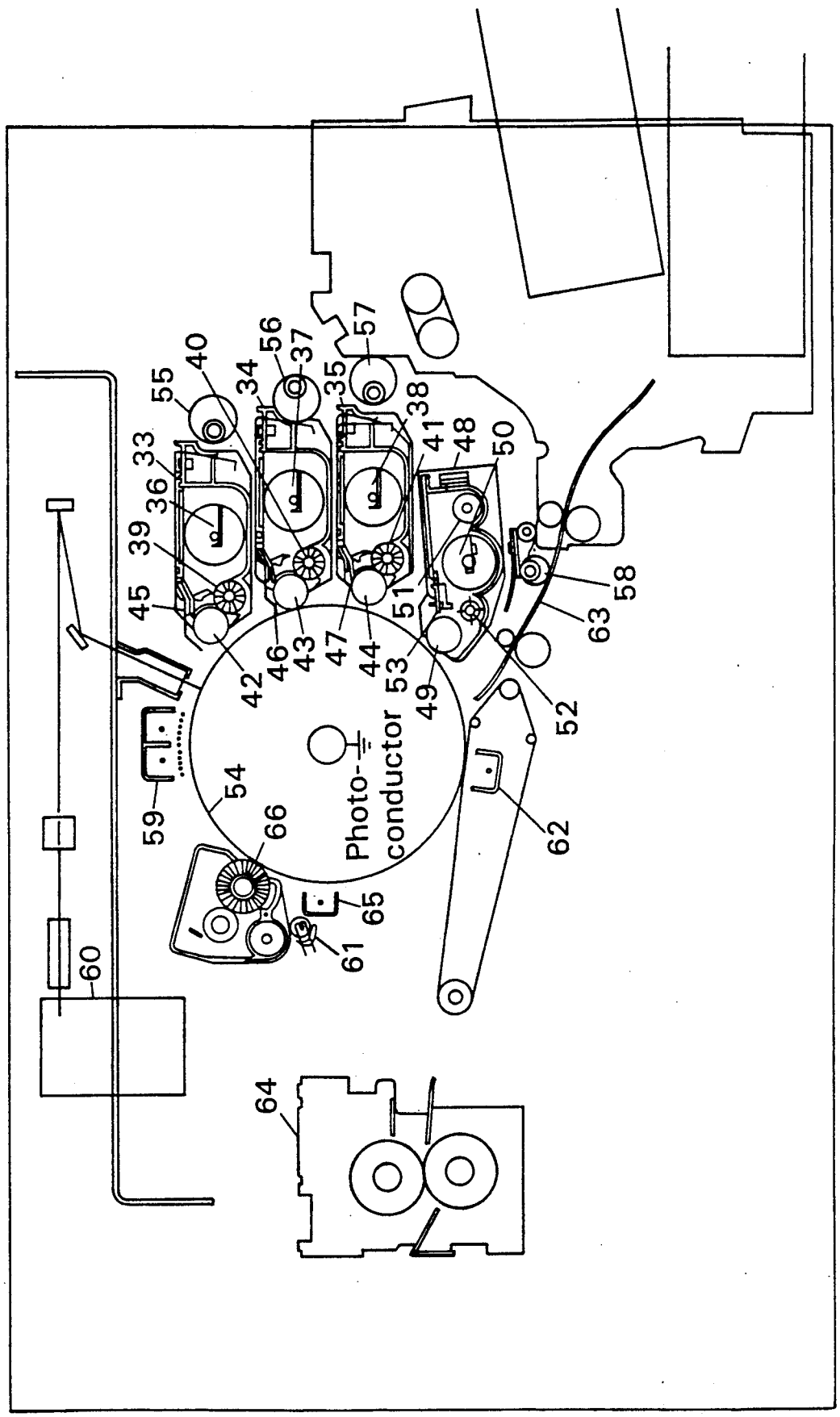
FIG. 14 a schematic diagram of an apparatus embodying the electrophotographic color image forming method in one example of the present invention.

Referring to FIG. 14, the reference numerals 33, 34 and 35 indicate non-magnetic, monocomponent developer units of a non-contact type which project toner in a direct current electric field, the toner being fed to respective developing rollers by means of feeding blades 36, 37 and 38 provided in the developer units. The toner is charged triboelectrically with conductive fur brushes 39, 40 and 41 disposed in a contacting array with the respective developing rollers, thereby causing a thin layer of toner to form on the aluminum developing rollers 42, 43, and 49 by means of respective blades 45, 46, and 47. The developer unit 33 contains insulative toner of yellow (Y), the developer unit 34 magenta (M), and the developer unit 35 cyan (C). The reference numeral 48 indicates a contact type developer unit which contains dual-component developer, widely used in an electrophotographic apparatus, consisting of insulative toner and magnetic carrier. The reference numeral 49 indicates a developing roller with a magnet contained therein, 50 a mixing blade, 51 a feeding auger for feeding toner from a toner hopper, 52 a developer mixing blade, and 53 a doctor blade. The developer units are disposed facing the circumference of a photoconductor 54, with a given gap (developing gap) provided between each of the developing rollers 42, 43, 44 and 49 and the photoconductor 54. The developer units are provided with moving mechanisms 55, 56, 57 and 58 respectively for causing them to move closer to the photoconductor when developing is performed and to retract when developing is not performed.

The following shows the specification and developing conditions of the black developer unit 48, and the properties of the toner used.

SPECIFICATION AND DEVELOPING CONDITIONS OF DEVELOPER UNIT

Diameter of developing roller 49: 22 mm

Surface speed of developing roller 49: 340 mm/s

Developer layer thickness on developing roller 49: 400 $\mu$m

Rotating direction of developing roller 49: With-direction of the photoconductor 54 (Same feeding direction)

Developing gap (gap between developing roller surface and photoconductor surface): 400 $\mu$m in developing condition, 2 mm in non-developing condition

PROPERTIES OF TONER

Type of developer: Dual-component developer of toner and carrier

Average particle diameter of carrier: Approximately 50 $\mu$m

Type of carrier: Teflon-coated ferrite

Charge amount of toner: +10 $\mu$C/g

Average particle diameter of toner: 8 $\mu$m

Relative permittivity of toner: Approximately 2

The following shows the specification and developing conditions of the yellow, magenta and cyan developer units, and the properties of the toner used.

SPECIFICATION AND DEVELOPING CONDITIONS OF DEVELOPER UNIT

Diameter of developing roller: 20 mm

Surface speed of developing roller: 160 mm/s

Rotating direction of developing roller: With-direction of the photoconductor 54 (Same feeding direction)

Toner layer thickness on developing roller: 32 μm

Developing gap (gap between developing roller surface and photoconductor surface): 150 μm in developing condition, 2 mm in non-developing condition

PROPERTIES OF TONER

Charge amount of toner: +3 μC/g
Average particle diameter: 10 μm
Relative permittivity: Approximately 2

The following describes the specification of the laser used as the light source for the above apparatus. Also, the light amount distribution of one spot is illustrated in FIG. 7.

SPECIFICATION OF LASER

Wavelength: 780 nm
Spot diameter: Area of $1/e^2$ of peak intensity to be 90 μm (where e is the base of natural logarithm)
Exposure resolution : 400 dots per inch
Exposure amount for black (value on photoconductor surface): Reference exposure amount=1.0 mW
Exposure amount for color:
Reference exposure amount=1.5 mW,
Increased exposure amount=3.4 mW Referring to FIG. 7, the reference character A indicates the light intensity distribution of one spot with the increased exposure amount for color, B with the reference exposure amount for color, and C with the reference exposure amount for black.

The following describes the logic for determining the exposure amount for each attention spot.

LOGIC

Reference spots:
A total of 8 spots shown in FIG. 1
Exposure amount:
(1) Increased exposure amount when all 8 reference spots are in a non-exposure state
(2) Reference exposure amount for other cases To recognize whether the spot to be exposed is in a shadow area or a highlight area, reference should be made in the exposure process for each color, to certain spots out of the eight adjacent spots located at the front, back, left, right, diagonally left and right to the front and diagonally left and right to the back of an attention spot on a photoconductor. The judgment of the highest accuracy can be obtained when reference is made to all the eight spots located at the front, back, left, right, diagonally left and right to the front and diagonally left and right to the back of the attention spot.

An amorphous Se-Te photoconductive drum of 152 mm in diameter having increased sensitivity to the longer wavelength in the infrared region (functionally separated selenium photoconductor having increased sensitivity to the longer wavelength in the infrared region, photoconductive layer thickness 60 μm, relative permittivity approximately 7) was used for the photoconductor 54, which was made to rotate at the surface speed of 160 mm/s. The photoconductor 54 was charged at the potential of +900 V by means of a corona charger 59 (scorotron charger, corona voltage: +7 kV, grid voltage: +1 kV).

Next, a semiconductor laser 60 was energized to emit exposure light. At this time, the exposure on the photoconductor surface was set at the reference exposure amount. Using the semiconductor laser 60, a negative black signal was projected onto the photoconductor 54 to form an electrostatic latent image thereon. The latent image was reversely developed to form a black toner image by the black developer unit 48 which was put in a developing condition with +600 V applied to the developing roller 49. The photoconductor 54 was then discharged by means of a eraser lamp 61. The black toner image developed at this time on the photoconductor 54 reached one to two layers, the toner thickness being 10 to 20 μm.

The photoconductor 54 was again charged this time at +600 V by the corona charger 59 (scorotron charger, corona voltage: +7 kV, grid voltage: +600 V). At this time, the charge potential at the photoconductor 54 with the black toner image formed thereon was 600 V. Thereafter, the light of signal corresponding to yellow was projected by the semiconductor laser 60 onto the photoconductor 54 to form a yellow electrostatic latent image. At this time, the semiconductor laser output was set at the increased exposure amount for highlight areas in accordance with the previously mentioned logic. Then, the photoconductor was made to pass the yellow developer unit 33 in a developing condition with +600 V applied to the developing roller 42, and then the magenta developer unit 34, the cyan developer unit 35 and the black developer unit 48, all in a non-developing condition, to form a yellow toner image.

Next the photoconductor 54, without being discharged, was again charged this time at +810 V by the corona charger 59 (scorotron charger, corona voltage: +7 kV, grid voltage: +800 V). At this time, the charge potential at the photoconductor 54 with the black and yellow toner images formed thereon was +810 V. Thereafter, the light of signal corresponding to magenta was projected by the semiconductor laser 60 onto the photoconductor 54 to form a magenta electrostatic latent image. At this time, the semiconductor laser output was set at the increased exposure amount for highlight area in accordance with the previously mentioned logic. Then, the photoconductor 54 was made to pass the yellow developer unit 33 in a non-developing condition, and the magenta developer unit 34 in a developing condition with +800 V applied to the developing roller 40, to form a magenta toner image. At this time, the toner where the yellow and magenta were superposed in the highlight areas on the photoconductor 54 reached two to four layers, the thickness being 20 to 40 μm. The photoconductor 54 was then made to pass the cyan developer unit 35 and the black developer unit 48 both in a non-developing condition. Next, the photoconductor 54, without being light-discharged, was again charged this time at +840 V by the corona charger 59. At this time, the charge potential at the photoconductor 54 with the black, yellow and magenta toner images formed thereon was +800 V. Also, the charge potential at the area on the photoconductor 54 where the yellow and magenta toner images were superposed was +780 V. Thereafter, the light of the signal corresponding to cyan was projected by the semiconductor laser 60 to form a cyan electrostatic latent image. At this time, the semiconductor laser output was set at the increased exposure amount for highlight areas in accordance with the previously mentioned logic. Then, the photoconductor 54 was made to pass the yellow developer unit 33 and the magenta developer unit 34 both in a non-developing condition, and then the cyan developer unit 35 in a developing condition with +800 V applied to the developing roller 44, to form a cyan toner image, thus completing a color image on the photoconductor.

The color toner image thus formed on the photoconductor 54 was transferred to paper 63 by means of a transfer corona 62, after which the image was fused by the fuser unit 64. In the meantime, after transfer, the surface of the photoconductor 54 was positively charged by a pre-cleaning charger 65 (corona voltage +5.5 kV), and then cleaned with a conductive fur brush 66 with −150 V applied thereto by pressing it on the photoconductor 54.

As a result, there reproduced a clear color copy image of high saturation with the combination color density of red, green and blue solid portions more than 1.5, good reproducibility of the highlight areas in the color image, and good balance between the color and black components.

EXAMPLE 2

Using the apparatus described in Example 1, a color image was formed with the logic for the attention spot changed as shown in FIG. 13, the other image forming conditions remaining unchanged.

The logic for determining the exposure amount for each attention spot is described below.

LOGIC

Reference spots:
A total of 8 spots shown in FIG. 1
Exposure amount:
(1) Increased exposure amount when all 8 reference spots are in a non-exposure state (FIG. 13a)
(2) Decreased exposure amount when 2, 1 and 0 of the 8 reference spots are in a non-exposure state (FIG. 13 b, c, d)
(3) Reference exposure amount for other cases As a result, enhanced reproduction of the highlight areas was recognized when the exposure for the attention spot was set at the increased exposure amount when all the eight reference spots were in a non-exposure state, and at the reference or decreased exposure amount for other conditions. Furthermore, a clear color copy image of high saturation was reproduced with the combination color density of red, green and blue solid portions more than 1.5, good reproducibility of highlight areas around the density of 0.2 in the color image, no overtoning of shadow areas of density over 1.2, and good balance between the color and black components.

EXAMPLE 3

Using the apparatus described in Example 1, a color image was formed with the logic for the attention spot changed as shown in FIG. 13, the other image forming conditions remaining unchanged. The logic for determining the exposure amount for each attention spot is described below.

LOGIC

Reference spots:
A total of 8 spots shown in FIG. 1
Exposure amount:
(1) Increased exposure amount when 7 of the 8 reference spots are in a non-exposure state (FIG. 13 a, e)
(2) Decreased exposure amount when 2, 1 and 0 of the 8 reference spots are in a non-exposure state (FIG. 13 b, c, d)
(3) Reference exposure amount for other cases As a result, a clear color copy image of high saturation was reproduced, with the combination color density of red, green and blue solid portions more than 1.5, good reproducibility of highlight areas around the density of 0.2 in the color image, enhanced reproducibility of fine character lines, no overtoning of shadow areas of density over 1.2, and good balance between the color and black components.

EXAMPLE 4

Using the apparatus described in Example 1, a color image was formed with the logic for the attention spot changed as shown in FIG. 13, the other image forming conditions remaining unchanged. The logic for determining the exposure amount for each attention spot is described below.

LOGIC

Reference spots:
A total of 8 spots shown in FIG. 1
Exposure amount:
(1) Increased exposure amount when all 8 reference spots are in a non-exposure state (FIG. 13a)
(2) Decreased exposure amount when 3, 2, 1 and 0 of the 8 reference spots are in a non-exposure state (FIG. 13 b, c, d, f)
(3) Reference exposure amount for other cases As a result, a clear color copy image of high saturation was reproduced, with the combination color density of red, green and blue solid portions more than 1.5, good reproducibility of highlight areas around the density of 0.2 in the color image, enhanced reproducibility of fine character lines, no overtoning of shadow areas of density over 1.0, and good balance between the color and black components.

EXAMPLE 5

Furthermore, the method in which the eight adjacent dots located at the front, back, left, right, diagonally left and right to the front and diagonally left and right to the back of the attention dot on the photoconductor, plus the 16 dots adjacent outwardly to the eight dots, thus, a total of 24 dots referred to in the exposure process for each color, provides the highest accuracy in determining the exposure amount for the attention dot.

The smoothest reproduction of highlight areas has been achieved with the increased exposure amount for the exposed dot when all the 24 reference dots are in a non-exposure.

Using the apparatus described in Example 1, a color image was formed with the logic for the attention spot changed as shown in FIG. 7, the other image forming conditions remaining unchanged. The logic for determining the exposure amount for each attention spot is described below.

LOGIC

Reference dots: A total of 24 dots shown in FIG. 7
Exposure amount:
(1) Increased exposure amount for the attention dot when all 24 reference dots are in a non-exposure state
(3) Reference exposure amount for other cases As a result, a clear color copy image of high saturation, with the combination color density of red, green and blue solid portions more than 1.5, good reproducibility of highlight areas around the density of 0.2 in the color image, enhanced reproducibility of fine character lines, no overtoning of shadow areas of density over 1.0, and good balance between the color and black components was reproduced.

ADVANTAGES OF THE INVENTION

The present invention provides an electrophotographic image forming method for reproducing a color copy image by repeating the cycle of charging, exposing and developing a plurality of times to superimpose black and color toner images on a photoconductor, wherein the exposure amount for each exposed spot for black and color is increased or decreased for the formation of an electrophotographic color copy image of good quality with good balance between black and color, good reproducibility of highlight areas, and no overtoning of shadow areas. The present invention is also effective for a so-called twin color electrophotographic image forming method, such as red and black, and blue and black. Furthermore, the present invention is effective for the formation of full color images. For good reproduction of a full color image, reproduction of shadow areas as well as highlight areas is an important factor. The present invention is particularly effective for the formation of full color images using three kinds of toners, yellow, magenta and cyan.

The present invention also provides a magnetic brush developing method, which is a contact developing method with developer on a developing roller contacting with a photoconductor, for developing black which needs a lower reference exposure setting than the exposure for color using a direct current electric field projection developing method, wherein low fidelity to an electrostatic latent image and tendency to develop a latent image larger than its actual size, both shortcomings inherent to the magnetic brush developing method which can develop fine lines with sufficient density, are overcome. Furthermore, the present invention is effective as a developing method in the case of stronger black component when the so-called toner projection development, i.e., a developing method in which an AC voltage is applied between the photoconductor and the developing roller, and the photoconductor does not come in contact with the developer on the developing roller, is used for development of black.

We claim:

1. An electrophotographic image forming method for reproducing a color image by repeating the cycle of charging, exposure and developing a plurality of times to superimpose black and color toner images on a photoconductor, wherein exposure is provided by a beam of light decomposed in pixels, the exposure being varied for a beam spot between black and color images.

2. An electrophotographic image forming method as set forth in claim 1, wherein the color consists of yellow, magenta and cyan.

3. An electrophotographic image forming method as set forth in claim 1, wherein the formation of images is performed by first forming a black image.

4. An electrophotographic image forming method as set forth in claim 3, wherein development of the black image is performed by a contact developing method in which a photoconductor comes in contact with a developer on a developer holder.

5. An electrophotographic image forming method as set forth in claim 3, wherein development of the black image is performed by a developing method in which an AC voltage is applied between a developer roller and the photoconductor, the photoconductor not contacting with the developer on the developer roller.

6. An electrophotographic image forming method as set forth in claim 1, wherein a reference exposure amount for black is set at a lower value than that for color.

7. An electrophotographic image forming method as set forth in claim 1, wherein the light intensity distribution of an exposure light source approximates the Gaussian distribution.

8. An electrophotographic image forming method as set forth in claim 7, wherein the exposure light source is a laser.

9. An electrophotographic image forming method as set forth in claim 7, wherein an increased exposure amount is provided by increasing the exposure per unit time as compared with the reference exposure amount.

10. An electrophotographic image forming method for reproducing a color image by repeating the cycle of charging, exposing and developing a plurality of times to superpose black and color toner images on a photoconductor, wherein exposure is provided by a beam of light decomposed in pixels, the exposure being varied for a beam spot between black and color images, and wherein development is performed by a direct current electric field projection developing method, exposure being provided by a beam of light decomposed in pixels and being varied for an attention spot to be exposed on a photoconductor by referring to several spots surrounding the attention spot.

11. An electrophotographic image forming method as set forth in claim 10, wherein the surrounding reference spots include at least several spots out of eight adjacent spots located at the front, back, left, right, diagonally left and right to the front, and diagonally left and right to the back of the attention spot to be exposed on the photoconductor.

12. An electrophotographic image forming method as set forth in claim 4, wherein the surrounding reference spots consist of the eight adjacent spots located at the front, back, left, right, diagonally left and right to the front, and diagonally left and right to the back of the attention spot to be exposed on the photoconductor.

13. An electrophotographic image forming method as set forth in claim 12, wherein exposure for the attention spot is set at an increased exposure amount when all the eight reference spots are in a non-exposure state, and at a reference or decreased exposure amount for other conditions.

14. An electrophotographic image forming method as set forth in claim 10, wherein the surrounding reference spots consist of the eight adjacent dots located at the front, back, left, right, diagonally left and right to the front, and diagonally left and right to the back of the attention spot to be exposed on the photoconductor, plus 16 dots adjacent to the eight dots, a total of 24 dots.

15. An electrophotographic image forming method as set forth in claim 14, wherein exposure for the dot to be exposed is set at an increased exposure amount when all the 24 reference dots are in a non-exposure state.

16. An electrophotographic image forming method as set forth in claim 10, wherein the light intensity distribution of an exposure light source approximates the Gaussian distribution.

17. An electrophotographic image forming method as set forth in claim 16, wherein the exposure light source is a laser.

18. An electrophotographic image forming method as set forth in claim 16, wherein an increased exposure amount is provided by increasing the exposure per unit time as compared with the reference exposure amount.

* * * * *